N. M. ROSENDAHL.
MACHINE FOR MAKING ASPHALTIC OR OTHER MIXTURES.
APPLICATION FILED JAN. 22, 1913.
1,206,918.
Patented Dec. 5, 1916.
7 SHEETS—SHEET 1.
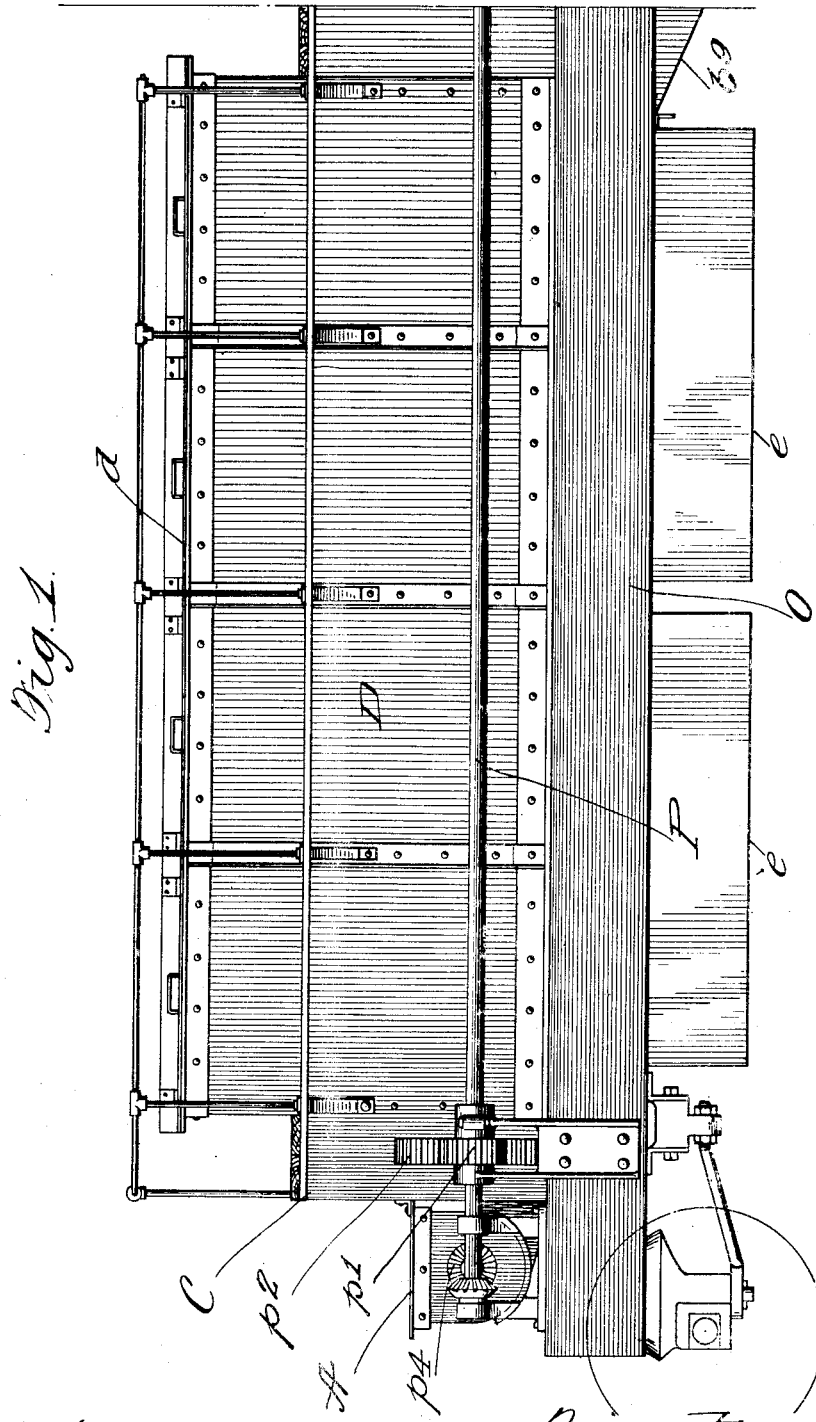

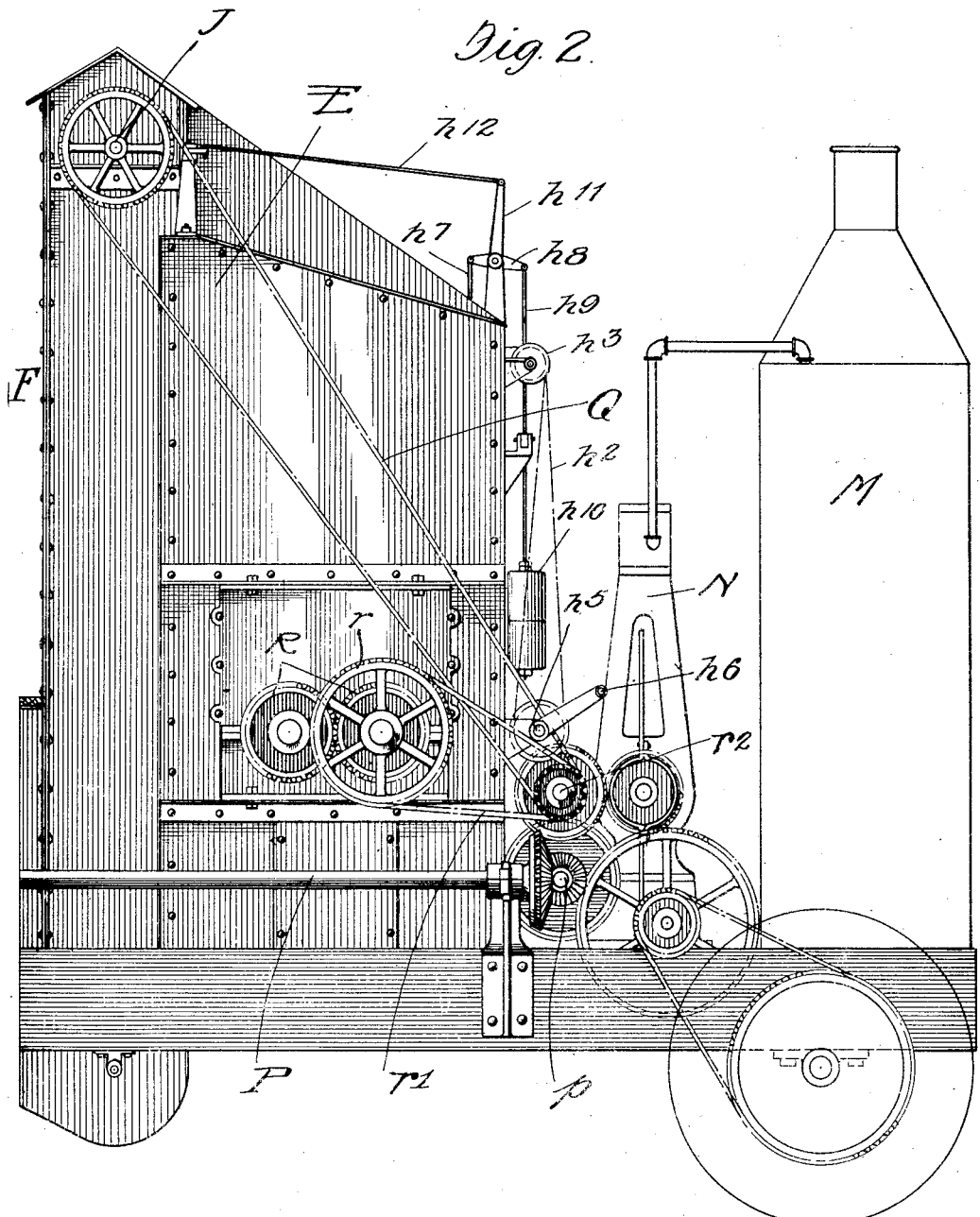

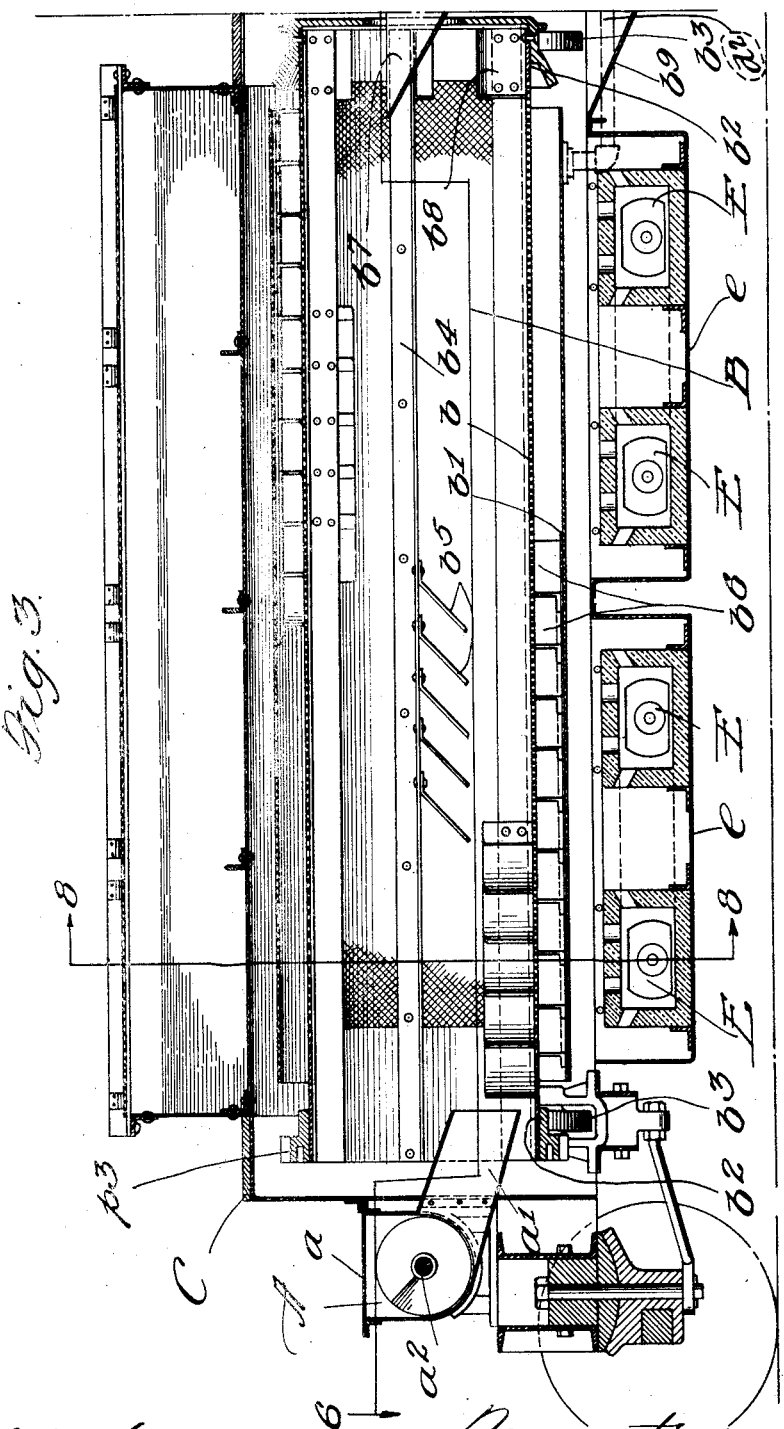

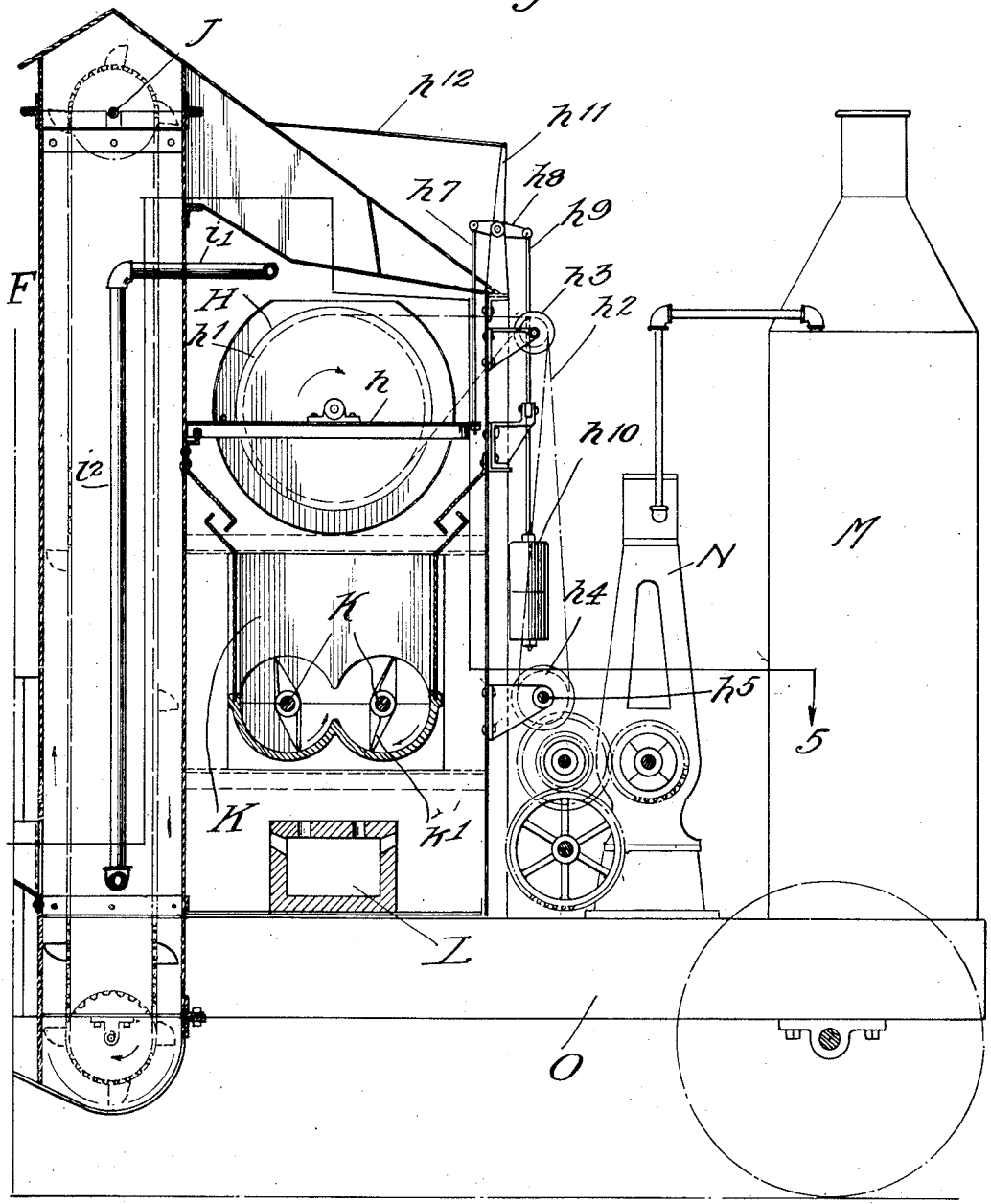

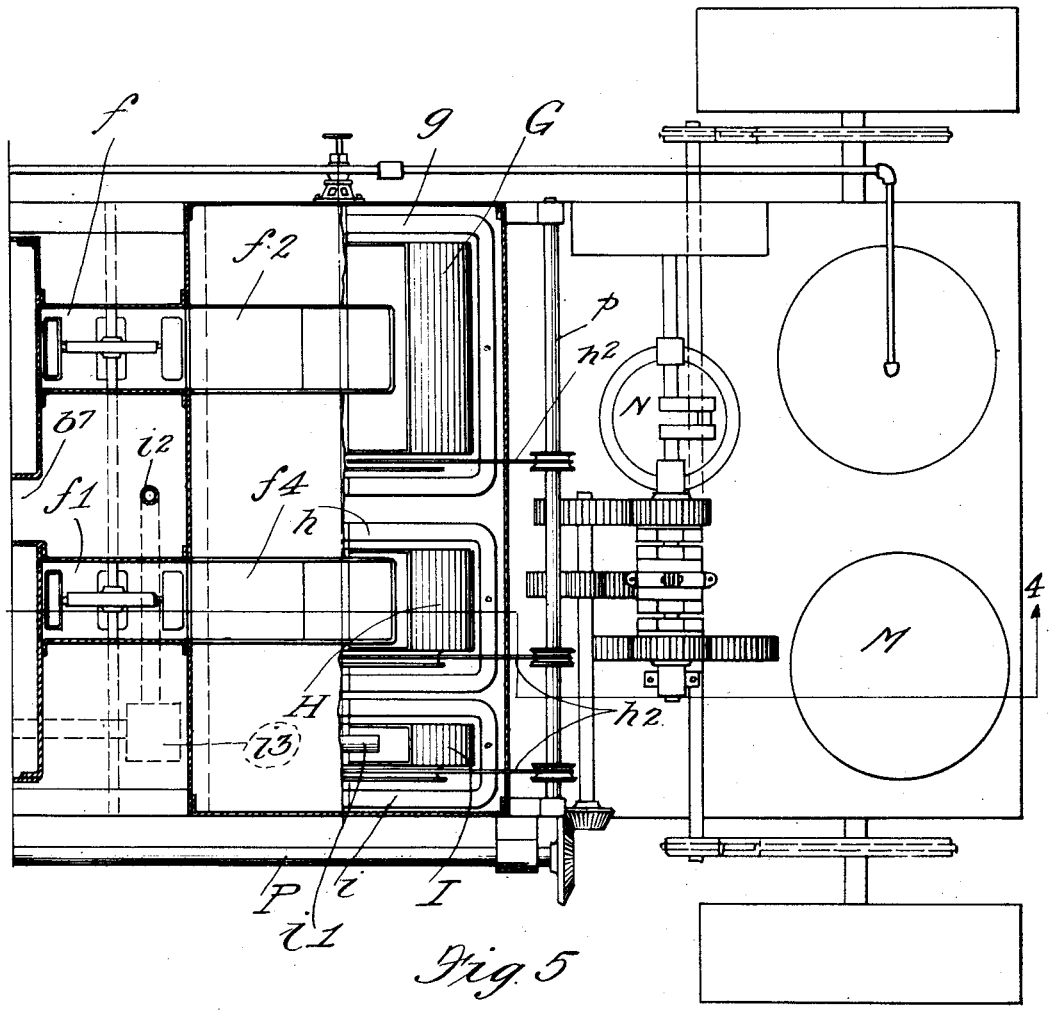

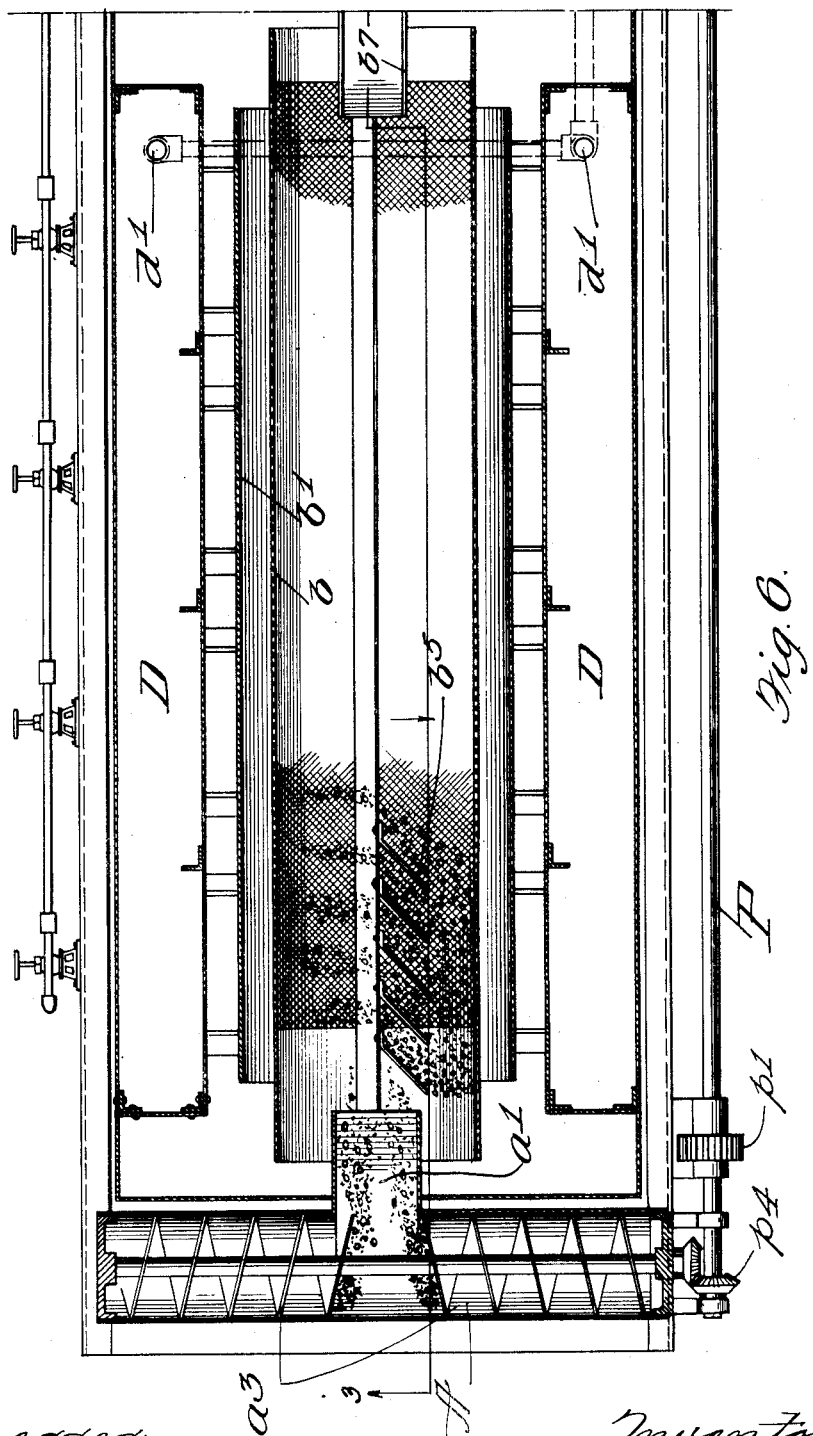

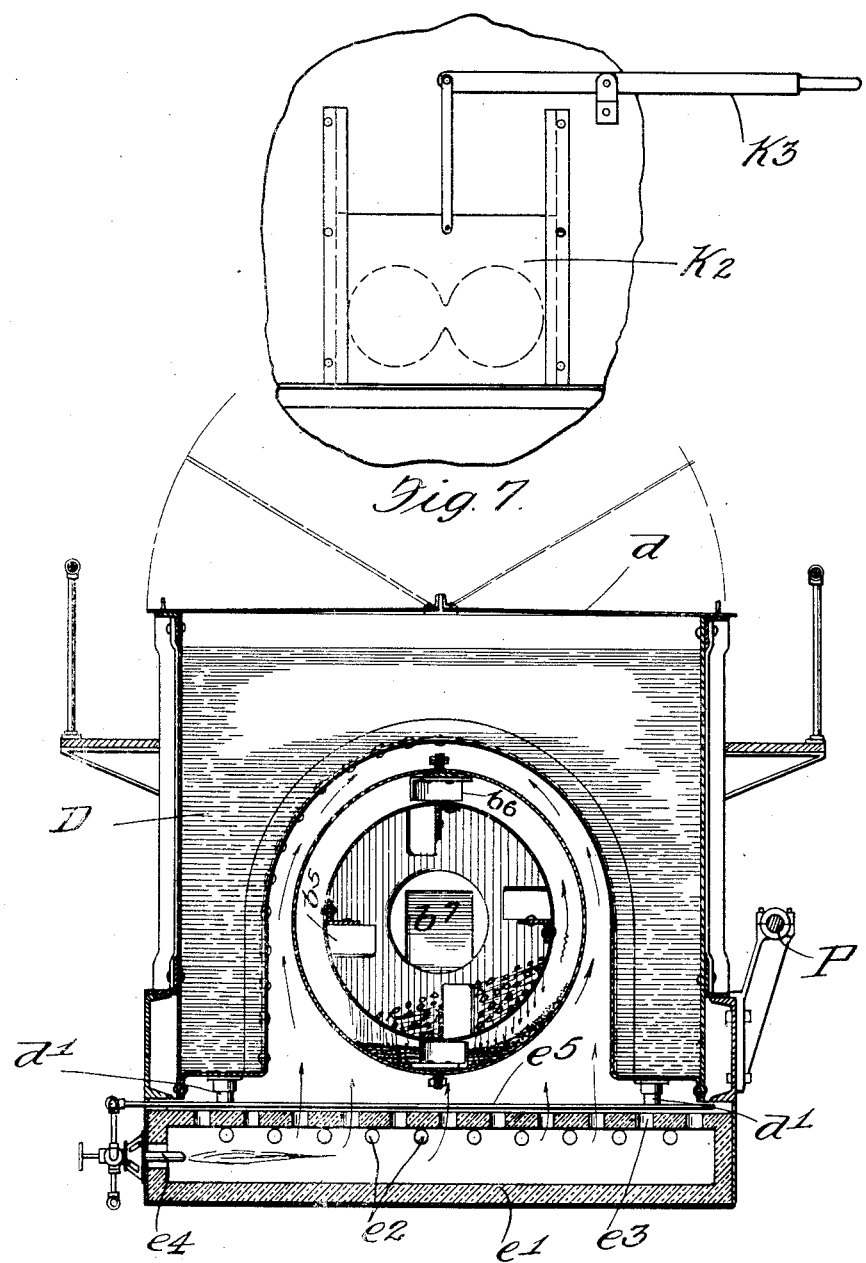

UNITED STATES PATENT OFFICE.

NILS M. ROSENDAHL, OF CHICAGO, ILLINOIS, ASSIGNOR TO FREDERICK C. AUSTIN, OF CHICAGO, ILLINOIS.

MACHINE FOR MAKING ASPHALTIC OR OTHER MIXTURES.

1,206,918.        Specification of Letters Patent.        Patented Dec. 5, 1916.

Application filed January 22, 1913. Serial No. 743,430.

*To all whom it may concern:*

Be it known that I, NILS M. ROSENDAHL, a citizen of the United States of America, and resident of Chicago, Cook county, Illinois, have invented a certain new and useful Improvement in Machines for Making Asphaltic or other Mixtures, of which the following is a specification.

My invention relates to machinery for heating and mixing the crushed rock or stone, sand and asphalt from which mixtures are made for various purposes, as for example, putting down paving. The best results are obtained, it has been found, when the crushed rock or stone and sand are heated before being mixed with the asphalt, or other adhesive binder, and when the different materials are combined in certain proportions. Again, it is necessary to keep the supply of asphalt or other similar material hot, and it is also necessary to again heat the materials while they are being mixed.

Generally stated, the object of my invention is to provide a novel and highly efficient machine, of a unitary character, for separating or grading the crushed rock or stone and sand, heating the same, proportioning the different materials preparatory to combining them, and then mixing the crushed rock or stone and sand with hot asphalt, or other similar material, whereby the necessary steps or operations are all combined in one unitary machine, thus greatly facilitating the work of putting down a paving of this kind, or of utilizing the mixture for any other purpose.

Special objects are to provide novel and efficient means for simultaneously separating the sand from the coarser materials, such as crushed rock or stone, and heating the same as they travel forward; to provide novel and efficient means for heating the supply of asphalt or other adhesive binder at the same time that the crushed rock or other materials are being separated and heated; to provide a novel and efficient arrangement for measuring off predetermined quantities of the various materials, preparatory to combining the same, the proportioning being according to weight, and whereby the different quantities may then be simultaneously discharged into the mixing receptacle; to provide a novel and efficient arrangement whereby the weighing apparatus serves automatically to control the conveying mechanism by which the materials are delivered thereto, except the asphalt or other adhesive binder, and whereby the delivery of said materials is discontinued as soon as the predetermined quantities thereof have accumulated in the different receptacles with which the weighing apparatus is provided for this purpose; to provide a novel and efficient construction whereby the elements of the machine are all combined and associated together on a single body or platform, and arranged in combination with a power plant of suitable character, whereby practically everything necessary for carrying on the work of preparing and mixing the materials is embodied in one unitary machine; and to provide certain details and features of improvement and combinations tending to increase the general efficiency and serviceability of a machine for preparing and mixing materials of this particular character.

To the foregoing and other useful ends, my invention consists in matters hereinafter set forth and claimed.

In the accompanying drawings: Figure 1 is a side elevation of one end portion of a machine embodying the principles of my invention, this end of the machine including the means for separating and heating the sand and crushed rock or stone, and for heating the supply of asphalt or other adhesive binder. Fig. 2 is a side elevation of the other end portion of the said machine, this end of the machine including the apparatus for conveying the sand and crushed rock and asphalt to an elevated position, and weighing mechanism for then receiving the different materials, and proportioning the same, according to weight, the machine at this end being also provided with a suitable power plant for operating the various instrumentalities of which the unitary machine thus provided is composed. Fig. 3 is a longitudinal section of the portion of the machine shown in Fig. 1. Fig. 4 is a longitudinal section of that portion of the machine shown in Fig. 2. Fig. 5 is a horizontal section on line 5—5 in Fig. 4. Fig. 6 is a horizontal section on line 6—6 in Fig. 3. Fig. 7 is a fragmentary view showing the gate by which the mixture is discharged from the mixing receptacle. Fig. 8 is a cross section on line 8—8 in Fig. 3.

As thus illustrated, and referring to Figs. 3 and 8, the means for preparing the materials, preliminary to mixing the same together, are as follows: The feeding device A comprises a hopper $a$ provided with a discharge spout $a^1$, projecting within the machine, said hopper extending transversely of the machine at the end thereof. A transverse and horizontally disposed shaft $a^2$ is arranged in the said hopper, and is provided with right and left screws $a^3$, which feed the materials to the center of the hopper, and then into the said spout. From the said spout the materials are delivered to a rotary drum C comprising inner and outer shells $b$ and $b^1$, the inner shell being perforated to serve as a screen, and having imperforate end portions $b^2$ which rest upon wheels or rollers $b^3$, which latter are suitably mounted within the body C of the machine. The said inner shell $b$ is provided with longitudinal ribs $b^4$ having feed blades $b^5$, whereby the materials are gradually fed forward within the drum, it being observed that these blades are arranged obliquely relative to the said ribs. The two shells are spaced a distance apart, the outer shell being imperforate throughout the length thereof, and the said space between the two shells being provided with feed blades $b^6$, whereby the sand and other fine particles which pass through the perforations of the inner shell are gradually fed forward. A stationary spout $b^7$ receives the relatively coarse materials, such as crushed rock or stone, from the delivery end of the drum, the said inner shell being provided with lifting blades $b^8$ for this purpose, said blades carrying the materials upward and dropping them into said spout. Another spout $b^9$ receives the sand and relatively fine materials from the end of the outer shell. The tank D overlies the rotary drum, and extends at each side thereof, serving as a sort of housing therefor, space being provided between the drum and the inner surface of said tank. The top of the tank is provided with covers or doors $d$, which, when opened, permit of the introduction of asphalt or other similar materials into the tank. The end of the tank is provided with pipe connections $d^1$ at the bottom thereof, which connections are joined to the feed pipe $d^2$ by which the hot asphalt is delivered to the other end of the machine, as will hereinafter more fully appear. A plurality of burners E, of any suitable character, are disposed in the receptacles $e$ below the rotary drum, whereby the contents of the said drum are heated while the relatively coarse materials are being separated from the relatively fine materials. At the same time the heat and products of combustion circulate around and above the rotary drum in contact with the inner surface of the tank D, whereby the contents of said tank is heated in the required manner. These burners, as shown, are each constructed from a hollow tile $e^1$ extending transversely of the machine, said tile having its side walls provided with openings $e^2$ for the escape of the heat and products of combustion, and its top wall provided with openings $e^3$ for the same purpose. A gas or oil burner $e^4$ is provided at the end of each tile, for producing the heat, it being understood that each tile is preferably constructed from terra cotta, vitreous material, or other suitable heat resisting substance. Steam is conveyed to these burners by pipes $e^5$, laid across the tops of the tiles E, whereby the steam is superheated before entering the burners to force the oil or other fuel therefrom. In this way the materials are properly separated from each other, and at the same time thoroughly heated while progressing to the other end of the machine.

The means for proportioning the different materials by weight, and mixing the same together, while subject to further heat, are as follows: The upright body F is provided at the side thereof facing toward the rotary drum with elevators $f$ and $f^1$, each involving an endless chain and bucket device, the lower end of the elevator $f$ receiving the materials from the spout $b^7$, and the lower end of the elevator $f^1$ receiving the materials from the spout $b^9$, whereby these materials are carried upward and discharged respectively into the spouts $f^2$ and $f^4$. A rotary receptacle G is mounted on the tilting bail $g$, which latter has its end portions fulcrumed or pivoted on the body of the machine, in the manner shown more clearly in Fig. 4. A similar but smaller receptacle H is mounted to rotate on the bail $h$, and a still smaller receptacle I is mounted to rotate on the bail $i$, these bails being similar to the bail $g$, except that they are of different sizes. These rotary receptacles are all open at their tops, and as they are all controlled and operated in the same manner, a description of one will be sufficient for all of them.

Referring, therefore, to Fig. 4, it will be seen that the receptacle H is provided at its end with a grooved disk $h^1$ for a belt $h^2$, which belt travels over a sheave $h^3$, and then downward to the sheave $h^4$ on the shaft $h^5$, this shaft being provided with a crank $h^6$ for the operation thereof. By this arrangement, and it being understood that each receptacle is provided with a belt connection of this character, the three receptacles can be rotated and upset at the same time, thus causing them to discharge their contents downwardly. The bail $h$ is supported at its outer end by a rod $h^7$ mounted on one end of a walking beam $h^8$, the other end of said walking beam being provided with a rod $h^9$, having a weight or counter-balance $h^{10}$ at the lower end thereof. The weights or counter-balances of the different receptacles are adjusted to keep the receptacles normally elevated, but when filled each receptacle raises its allotted weight or balance. The elevators are operated by a shaft J at the upper ends thereof, and each elevator is provided with a clutch of any suitable character (not shown) arranged on the said shaft. The arm $h^{11}$ on the top of the walking beam $h^8$ is connected by a rod $h^{12}$ with the clutch controlling the elevator $f^1$, whereby the downward movement of the receptacle H stops the running of the elevator $f^1$, thereby discontinuing the delivery of materials to said receptacle. A similar arrangement is provided for controlling the clutch of the elevator $f$, whereby this elevator is also stopped when the receptacle G is filled and moves downward. The receptacle I is supplied with hot asphalt or other similar material by the delivery pipe $i^1$, which pipe connects with a standpipe $i^2$ having a pump $i^3$ at its lower end, said pump connecting in turn with the pipe $d^2$ previously described. Any suitable arrangement may be employed for controlling the flow of asphalt through this connection, and when the receptacle I is filled, it moves downward like the other receptacles. As soon as this receptacle for weighing the asphalt moves downward, the operator or attendant then stops the flow of hot asphalt through the pipe connection, and the three receptacles are then ready to be turned over by operating the crank $h^6$, in a manner which will be readily understood. The three weighing receptacles can stand for some time with their contents undischarged, but when all is ready, the operator or attendant will rotate the shaft $h^5$ to dump the contents of said receptacles into the mixing tank or receptacle K, which latter is arranged directly below the said weighing receptacles. This mixing device comprises a pair of horizontal and transversely disposed shafts $k$, arranged at the bottom of the receptacle K, and each provided with agitating and feeding blades $k^1$, which blades have their outer edges disposed parallel with the shafts, but the inner portions of said blades being twisted around at an angle to feed the materials forward. In this way, the outer ends of the blades lift the materials upward, and as the materials then slide downward on each blade, toward the shaft, the twisted portion of the blade tends to force the materials forward in a direction parallel with the shafts. For this purpose the tank or receptacle K is provided with parallel trough-shaped portions in which the feeding blades rotate, and in which the materials are mixed and then fed toward the discharge end of the mixing tank or receptacle.

To discharge the materials, after being properly mixed, the gate $k^2$, shown in Fig. 7, is raised by the hand lever $k^3$, thus allowing the mixture to escape. The burner L, similar to those previously described, is disposed directly below the mixing device, whereby the materials are subjected to heat while being mixed. Thus, it will be seen that the crushed rock or stone or other similar comminuted materials are fed together, with the coarse mixed with the fine, and during the separation of the relatively fine materials from the relatively coarse materials, the same are properly heated. At the same time, and during this separation of the previously intermingled materials, the supply of asphalt or similar adhesive binder is heated to the required temperature, the body of asphalt or like material overlying as the means for separating or grading the other materials, and thus economically utilizing the heat which would otherwise be wasted. The materials thus graded and heated and properly prepared are then separately proportioned by weighing mechanism for this purpose, of the kind shown and described, whereby the proper or desired quantities are accumulated preparatory to mixing them together. As soon as the three weighing receptacles are filled with the different materials, thus determining the correct proportions thereof, the contents of each weighing receptacle is dumped into the mixing device, and the materials are here further subjected to heat while being agitated and mixed together. This is all accomplished, it will be seen, in a machine of a unitary and self-contained character, whereby the different steps necessary to the preparation of the materials for putting down paving, or other similar work, are all combined in one and the same machine, thus greatly facilitating work of this kind.

The feeding device A and the rotary drum B, together with the elevators $f$ and $f^1$, the shafts $k$ and the pump $i^3$, must all be driven or operated in some suitable manner, and for this purpose a power plant consisting of a boiler M and steam engine N is provided at the end of the machine, it being understood that all of these different instrumentalities, heretofore described, are mounted upon a platform or body O, and associated together in operative relation to each other. A longitudinally disposed shaft P is arranged at one side of the machine, and suitably connected by gearing $p$ with the said engine. The other end of said shaft is provided with a pinion $p^1$, that engages the idle gear $p^2$, which latter in turn engages the cog ring $p^3$ on the end of the rotary drum. This end of the shaft P is also connected by a bevel gearing $p^4$, with the shaft $a^2$ of the feeding device. In this way both the rotary drum and the feeding mechanism are driven by the said longitudinally disposed shaft, and primarily by the engine. The said engine is also connected with the elevator shaft J, by means including a belt Q, whereby the two elevators are suitably operated. The shafts k are connected by a gearing R, and one of said shafts is provided with a belt pulley r, connected by a belt r¹ with a shaft r² driven by the engine. Thus the mixing device is also driven by the said engine, it being understood that suitable clutches or other means (not shown) may be employed for manually controlling the different power transmitting connections. The pump i³ may be driven by any suitable connection to the said engine, and controlled in any suitable manner.

From the foregoing it will be seen that by my invention I provide a unitary and highly efficient machine for grading and otherwise preparing different kinds of materials, preliminary to mixing them together, and for mixing these materials in predetermined quantities, in a manner that is calculated to reduce the cost of putting down paving or other similar work, as everything necessary for making the mixture is combined in one and the same machine, the passing of the materials from one step to another, in the general operation, being automatic throughout the entire process, except for the dumping of the materials into the mixing devices, and as to this it will be seen that only slight effort and no skill are required.

The claims for the rotary separating and drying apparatus *per se* are in my divisional application No. 781,460.

What I claim as my invention is:

1. A machine for the purpose set forth, comprising means for feeding the materials, instrumentalities for separating the relatively fine portions of said materials from the relatively coarse portions thereof, mechanism for proportioning the said relatively fine and coarse materials, apparatus for delivering the materials from said instrumentalities to said mechanism, means for then mixing the said fine and coarse materials in the proportion determined by said mechanism, and means for heating the materials while they are being separated.

2. A machine for the purpose set forth, comprising means for feeding the materials, instrumentalities for separating the relatively fine portions of said materials from the relatively coarse portions thereof, mechanism for proportioning the said relatively fine and coarse materials, apparatus for delivering the materials from said instrumentalities to said mechanism, means for then mixing the said fine and coarse materials in the proportion determined by said mechanism, said mechanism including a plurality of movable receptacles, a counter-balance for each receptacle, and means for dumping said receptacles.

3. A machine for the purpose set forth, comprising means for feeding the materials, instrumentalities for separating the relatively fine portions of said materials from the relatively coarse portions thereof, mechanism for proportioning the said relatively fine and coarse materials, apparatus for delivering the materials from said instrumentalities to said mechanism, means for then mixing the said fine and coarse materials in the proportion determined by said mechanism, and means controlled by said mechanism for automatically stopping said apparatus.

4. A machine for the purpose set forth, comprising means for feeding the materials, instrumentalities for separating the relatively fine portions of said materials from the relatively coarse portions thereof, mechanism for proportioning the said relatively fine and coarse materials, apparatus for delivering the materials from said instrumentalities to said mechanism, means for then mixing the said fine and coarse materials in the proportion determined by said mechanism, and means for heating the mixture.

5. A machine for the purpose set forth, comprising means for feeding the materials, instrumentalities for separating the relatively fine portions of said materials from the relatively coarse portions thereof, mechanism for proportioning the said relatively fine and coarse materials, apparatus for delivering the materials from said instrumentalities to said mechanism, means for then mixing the said fine and coarse materials in the proportion determined by said mechanism, said mechanism including a weighing device for each grade of material, and said apparatus including an elevator for each said device, said devices being operable independently of each other, to weigh the materials, and means for causing said devices to discharge in unison.

6. A machine for the purpose set forth, comprising means for feeding the materials, instrumentalities for separating the relatively fine portions of said materials from the relatively coarse portions thereof, mechanism for proportioning the said relatively fine and coarse materials, apparatus for delivering the materials from said instrumentalities to said mechanism, means for then mixing the said fine and coarse materials in the proportion determined by said mechanism, means for heating the said instrumentalities, to heat the materials while being separated, and means for heating the materials while being mixed.

7. A machine for the purpose set forth, comprising means for feeding the materials, instrumentalities for separating the relatively fine portions of said materials from the relatively coarse portions thereof, mechanism for proportioning the said relatively fine and coarse materials, apparatus for delivering the materials from said instrumentalities to said mechanism, means for then mixing the said fine and coarse materials in the proportion determined by said mechanism, means for heating asphalt or the like, means for measuring off predetermined quantities of the hot asphalt, and means for causing the proportioned quantities of fine and coarse materials and asphalt to be dumped together into said mixing means.

8. A machine for the purpose set forth, comprising means for feeding the materials, instrumentalities for separating the relatively fine portions of said materials from the relatively coarse portions thereof, mechanism for proportioning the said relatively fine and coarse materials, apparatus for delivering the materials from said instrumentalities to said mechanism, means for then mixing the said fine and coarse materials in the proportion determined by said mechanism, the said mechanism having means for automatically stopping the supply of materials thereto, and a manually controlled means for supplying predetermined quantities of asphalt or the like to the said mixing means.

9. A machine for the purpose set forth, comprising means for preparing the materials, mechanism for separately weighing the different materials, apparatus for feeding the materials from said means to said mechanism, and a mixing device disposed in position to receive the predetermined quantities from said mechanism, and means whereby the said apparatus is automatically stopped by said mechanism.

10. A machine for the purpose set forth, comprising means for preparing the materials, mechanism for separately weighing the different materials, apparatus for feeding the materials from said means to said mechanism, a mixing device disposed in position to receive the predetermined quantities from said mechanism, said mechanism comprising a plurality of receptacles mounted to gravitate independently of each other, and means for upsetting the said receptacles in unison.

11. A machine for the purpose set forth, comprising means for preparing the materials, mechanism for separately weighing the different materials, apparatus for feeding the materials from said means to said mechanism, a mixing device disposed in position to receive the predetermined quantities from said mechanism, said mechanism comprising a plurality of rotary receptacles, means whereby the receptacles are bodily movable, a shaft, connection from said shaft to said receptacles, and means for operating said shaft to rotate the receptacle.

Signed by me at Chicago, Cook county, Illinois, this 18th day of January, 1913.

NILS M. ROSENDAHL.

Witnesses:
H. KNUDSON,
J. NORBY.